United States Patent
Ye et al.

(10) Patent No.: US 12,218,764 B2
(45) Date of Patent: *Feb. 4, 2025

(54) SIDELINK HARQ

(71) Applicant: Apple Inc., Cupertino, CA (US)

(72) Inventors: Chunxuan Ye, San Diego, CA (US); Dawei Zhang, Saratoga, CA (US); Wei Zeng, Saratoga, CA (US); Weidong Yang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/332,880

(22) Filed: Jun. 12, 2023

(65) Prior Publication Data

US 2023/0336282 A1 Oct. 19, 2023

Related U.S. Application Data

(63) Continuation of application No. 17/248,691, filed on Feb. 3, 2021, now Pat. No. 11,677,512.

(Continued)

(51) Int. Cl.
*H04L 1/1829* (2023.01)
*H04L 1/1812* (2023.01)
(Continued)

(52) U.S. Cl.
CPC .......... *H04L 1/1854* (2013.01); *H04L 1/1812* (2013.01); *H04L 1/1861* (2013.01); *H04L 5/0053* (2013.01); *H04W 72/20* (2023.01)

(58) Field of Classification Search
CPC ... H04W 28/04; H04W 72/04; H04W 72/042; H04W 88/08; H04W 72/20;
(Continued)

(56) References Cited

U.S. PATENT DOCUMENTS 8,848,591 B2 * 9/2014 Liu ............... H04L 5/0055
370/312
11,632,220 B2 * 4/2023 Park ............... H04W 52/0216
370/329
(Continued)

FOREIGN PATENT DOCUMENTS

CN 110166198 A * 8/2019 ........... H04L 5/0053
WO WO 2019/156529 A1 * 8/2019 ........... H04W 72/04
(Continued)

OTHER PUBLICATIONS

3GPP TS 38.213, Release 16, v16.0.0, (Dec. 2019), 11 sheets. (Year: 2019).*

(Continued)

*Primary Examiner* — Peter G Solinsky
*Assistant Examiner* — Sanjay K Dewan
(74) *Attorney, Agent, or Firm* — Fay Kaplun & Marcin, LLP

(57) ABSTRACT

A user equipment (UE) communicates with a further UE via a sidelink and communicates with a cell of a network via an uplink. The UE receives a hybrid automatic repeat request (HARQ) acknowledgement (ACK) timing parameter from the network, generates a sidelink HARQ-ACK codebook based on a signaling exchange with the further UE, wherein the sidelink HARQ-ACK codebook is constructed in decreasing order of one or more physical sidelink shared channel (PSSCH) transmission slots associated with a configured physical sidelink feedback channel (PSFCH) occasion, and transmits an indication of the sidelink HARQ-ACK codebook to the cell of the network.

17 Claims, 7 Drawing Sheets

Related U.S. Application Data

(60) Provisional application No. 62/975,580, filed on Feb. 12, 2020.

(51) Int. Cl.
 *H04L 5/00* (2006.01)
 *H04W 72/20* (2023.01)

(58) Field of Classification Search
 CPC ... H04L 5/0007; H04L 1/1854; H04L 1/1812; H04L 1/1861; H04L 5/0053
 USPC .......................................................... 370/329
 See application file for complete search history.

(56) References Cited

U.S. PATENT DOCUMENTS

| | | | | |
|---|---|---|---|---|
| 11,705,993 | B2* | 7/2023 | Khoshnevisan | H04L 1/1614 |
| | | | | 370/329 |
| 2020/0267597 | A1* | 8/2020 | Huang | H04W 76/14 |
| 2020/0336253 | A1* | 10/2020 | He | H04W 72/23 |
| 2020/0374978 | A1* | 11/2020 | Panteleev | H04W 72/0446 |
| 2021/0050950 | A1* | 2/2021 | Zhou | H04W 76/14 |
| 2021/0099269 | A1* | 4/2021 | Wu | H04L 27/2602 |
| 2021/0099974 | A1* | 4/2021 | Wu | H04L 5/0055 |
| 2022/0200738 | A1* | 6/2022 | Hosseini | H04L 1/1861 |
| 2023/0080157 | A1* | 3/2023 | Ko | H04L 1/1893 |
| | | | | 370/329 |
| 2023/0084917 | A1* | 3/2023 | Li | H04W 28/0215 |
| | | | | 370/329 |
| 2023/0109809 | A1* | 4/2023 | Fong | H04W 72/20 |
| | | | | 370/329 |
| 2023/0117472 | A1* | 4/2023 | Ko | H04L 5/0055 |
| | | | | 370/329 |
| 2023/0188265 | A1* | 6/2023 | Lee | H04L 1/1812 |
| | | | | 370/329 |
| 2023/0199770 | A1* | 6/2023 | Hu | H04W 72/20 |
| | | | | 370/329 |
| 2023/0262660 | A1* | 8/2023 | Park | H04L 5/0094 |
| | | | | 370/329 |
| 2023/0276490 | A1* | 8/2023 | Wu | H04L 1/1861 |
| | | | | 370/329 |
| 2023/0319787 | A1* | 10/2023 | Cozzo | H04W 72/0453 |
| | | | | 370/329 |

FOREIGN PATENT DOCUMENTS

| | | | | |
|---|---|---|---|---|
| WO | WO 2020/022940 A1 * | 1/2020 | ............... | H04L 1/18 |
| WO | WO 2020/213986 A1 * | 10/2020 | ............... | H04L 1/18 |
| WO | WO 2021/088810 A1 * | 5/2021 | ............ | H04W 72/04 |

OTHER PUBLICATIONS

3GPP TSG RAN WG1 Meeting #98bis, Chongqing, China, Oct. 14-20, 2019, R1-1911419, Source: vivo, Title: Discussion on mode 1 resource allocation mechanism, Agenda Item: 7.2.4.2.1. (Year: 2019).*

3GPP TSG RAN WG1 Meeting #99, Reno, USA, Nov. 18-22, 2019, R1-1912021, Source: vivo, Title: Discussion on mode 1 resource allocation mechanism, Agenda Item: 7.2.4.2.1. (Year: 2019).*

3GPP TS 38.213 v16.0.0 (Dec. 2019), Release 16, (total 9 pages). (Year: 2019).*

* cited by examiner

Table 400

| Row Index 405 | Time Duration Between PSSCH and PSFCH 410 |
|---|---|
| 1 | 5 |
| 2 | 4 |
| 3 | 3 |
| 4 | 2 |

Scenario 450

SIDELINK HARQ

BACKGROUND

A user equipment (UE) may be configured with multiple communication links. For example, the UE may receive a signal from a cell of a corresponding network over a downlink and may transmit a signal to the cell of the corresponding network over an uplink. The UE may also be configured to communicate with a further UE via a sidelink. The term sidelink refers to a communication link that may be utilized for device-to-device (D2D) communication. Thus, the sidelink may facilitate communication between the UE and the further UE without the use of a cell.

When configured with a sidelink, the UEs may utilize Hybrid automatic repeat request (HARQ) signaling. Generally, HARQ signaling refers to a signaling exchange in which information and/or data is sent from a transmitting device to a receiving device and in response, feedback is provided to the transmitting device. The feedback may indicate to the transmitting device whether a retransmission is to be performed. The HARQ feedback may also be provided to the cell of the network. Thus, while the information and/or data transmitted directly from the UE to the further UE over the sidelink does not go through a cell, the HARQ feedback may be provided to the network via the cell.

SUMMARY

Some exemplary embodiments are related to a user equipment (UE) having a transceiver configured to communicate with a further UE via a sidelink and to communicate with a cell of a network via an uplink and a processor communicatively coupled to the transceiver and configured to perform operations. The operations include receiving a hybrid automatic repeat request (HARQ) acknowledgement (ACK) timing parameter from the network, generating a sidelink HARQ-ACK codebook based on a signaling exchange with the further UE, wherein the sidelink HARQ-ACK codebook is constructed in decreasing order of one or more physical sidelink shared channel (PSSCH) transmission slots associated with a configured physical sidelink feedback channel (PSFCH) occasion and transmitting an indication of the sidelink HARQ-ACK codebook to the cell of the network.

Other exemplary embodiments are related to a user equipment (UE) having a transceiver configured to communicate with a further UE via a sidelink and to communicate with a cell of a network via an uplink and a processor communicatively coupled to the transceiver and configured to perform operations. The operations include receiving an indication that no physical uplink control channel resources (PUCCH) are assigned by the network for providing sidelink hybrid automatic repeat request (HARQ) feedback to the network and transmitting a HARQ feedback to the further UE.

Still further exemplary embodiments are related to a user equipment (UE) having a transceiver configured to communicate with a further UE via a sidelink and a processor communicatively coupled to the transceiver and configured to perform operations. The operations include determining candidate physical sidelink feedback channel (PSFCH) resources, wherein the candidate PSFCH resources correspond to a resource pool and wherein determining the candidate PSFCH resources is based on resource pool configuration information and transmitting hybrid automatic repeat request (HARQ) feedback on one or more of the PSFCH resources.

Additional exemplary embodiments are related to a user equipment (UE) having a transceiver configured to communicate with a further UE via a sidelink and a processor communicatively coupled to the transceiver and configured to perform operations. The operations include initiating a first resource selection procedure, wherein the first resource selection procedure includes a first sensing window and a first resource selection window, transmitting data on one or more resources in the first resource selection window, determining whether an acknowledgement (ACK) has been received in response to transmitting on the one or more resources in the first resource selection window, when no ACK has been received, initiating a second resource selection procedure, wherein the second resource selection procedure includes a second sensing window and a second resource selection window and transmitting the data on one or more resources in the second resource selection window.

DETAILED DESCRIPTION

Figure 1:
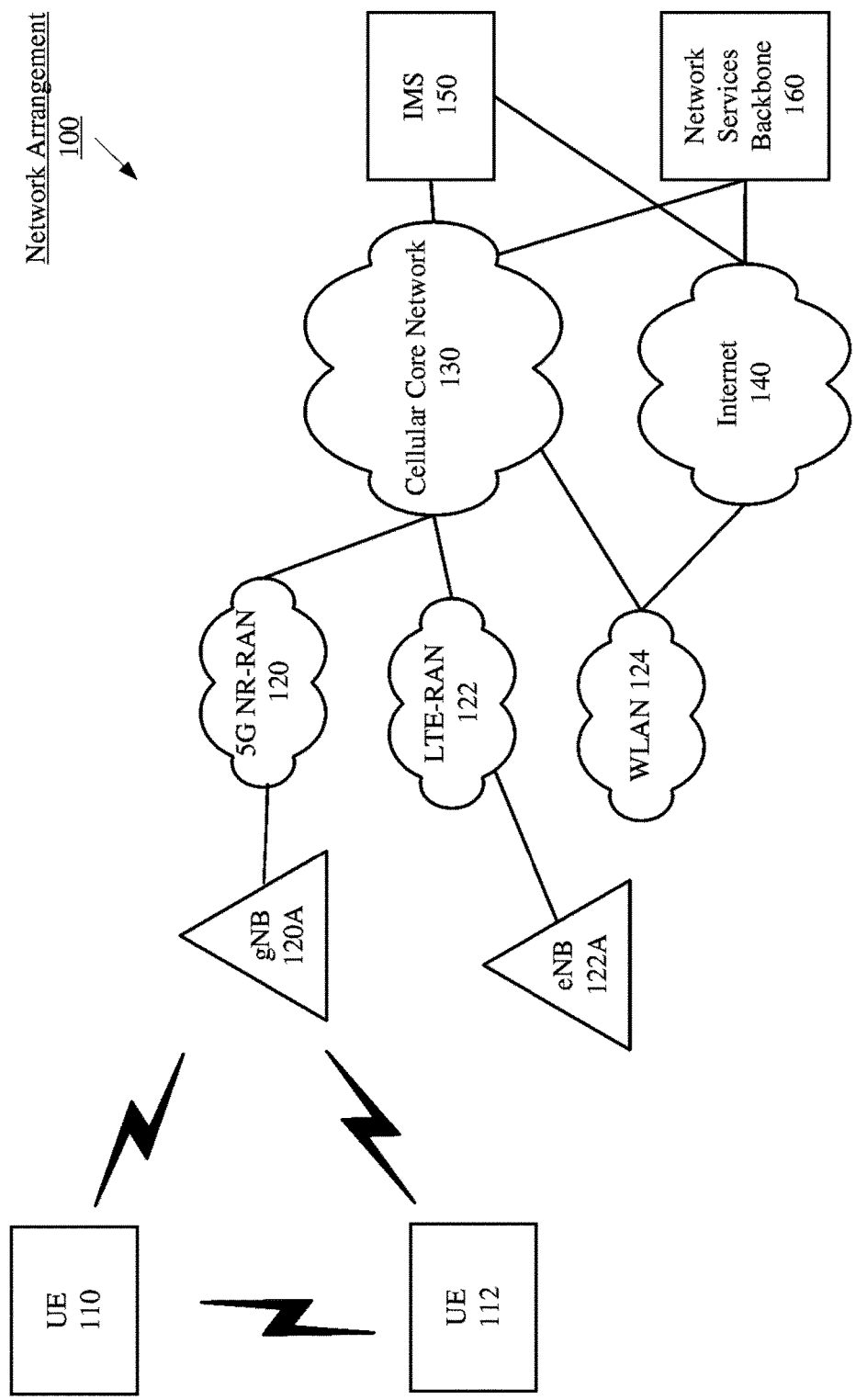
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to implementing a hybrid automatic repeat request (HARQ) mechanism for sidelink communications. As will be explained in more detail below, in a first aspect, the exemplary embodiments relate to providing HARQ feedback for sidelink communications to a cell of the network. In a second aspect, the exemplary embodiments relate to selecting resources that are to be utilized for transmitting HARQ feedback and performing retransmissions over the sidelink.

The exemplary embodiments are described with regard to the UE. However, reference to a UE is merely provided for illustrative purposes. The exemplary embodiments may be utilized with any electronic component that is configured with the hardware, software, and/or firmware to exchange information (e.g., control information) and/or data with the network. Therefore, the UE as described herein is used to represent any suitable electronic device.

The exemplary embodiments are also described with regard to a sidelink. The term "sidelink" generally refers to a communication link between the UE and a further UE. The sidelink provides direct device-to-device (D2D) communication where information and/or data exchanged between the UE and the further UE via the sidelink does not go through a cell. In some configurations, a single sidelink provides bidirectional communication between the UE and the further UE. In other configurations, a single sidelink provides unidirectional communication between the UE and the further UE. The exemplary embodiments may apply to either a bidirectional or unidirectional sidelink.

Sidelink communications are supported by both Long-Term Evolution (LTE) and 5G new radio (NR) standards. In some configurations, the network may provide information to the UE that indicates how a sidelink is to be established, maintained and/or utilized. Thus, while the information and/or data exchanged over the sidelink does not go through a cell, the UE and the network may exchange information associated with the sidelink. In other configurations, a sidelink is not under the control of the network. In either configuration, the UE and the further UE may still perform synchronization procedures, discovery procedures and exchange control information corresponding to the sidelink.

The exemplary embodiments are also described with regard to HARQ signaling. HARQ signaling generally refers to a signaling exchange in which information and/or data is sent from a transmitting device to a receiving device and in response, feedback is provided to the transmitting device. Throughout this description, the term "UE" may be used to represent the transmitting device and the term "further UE" may be used to represent the receiving device. For example, consider a scenario in which the UE is configured with a sidelink to the further UE. Initially, the UE may transmit information and/or data to the further UE via the sidelink. In response, the UE may receive feedback from the further UE. The feedback may indicate whether the further UE successfully received the information and/or data transmitted by the UE. If the feedback indicates that one or more portions of the information and/or data were not successfully received by the further UE, the UE may perform a retransmission.

Throughout this description reference may be made to the physical sidelink control channel (PSCCH), the physical sidelink shared channel (PSSCH) and the physical sidelink feedback channel (PSFCH). The PSCCH may refer to a communication channel between a transmitting device (e.g., the UE) and the receiving device (e.g., the further UE) that is configured to carry control information relevant to the sidelink. The PSSCH may refer to a communication channel between the transmitting device and the receiving device that is configured to carry payload data. The PSFCH may refer to a communication channel between the transmitting device and the receiving device that is configured to carry feedback relevant to the sidelink. The feedback may include HARQ feedback such as an acknowledgement (ACK) and a negative acknowledgement (NACK).

Throughout this description reference may also be made to the physical uplink control channel (PUCCH). The PUCCH may refer to a communication channel between a UE and a cell of the network. The exemplary embodiments relate to providing HARQ feedback relevant to the sidelink to the network via the PUCCH. Thus, the receiving device (e.g., the further UE) may be configured to provide HARQ feedback relevant to the sidelink to the transmitting device (e.g., the UE) via the PSFCH and the network via the PUCCH.

In a first aspect, the exemplary embodiments relate to constructing a sidelink HARQ-ACK codebook. Those skilled in the art will understand that a HARQ-ACK codebook generally refers to a mechanism that may be utilized for multiplexing HARQ feedback. As will be described in more detail below, the sidelink HARQ-ACK codebook is configured to include multiple instance of HARQ feedback relevant to the sidelink. The sidelink HARQ-ACK codebook may then be reported to a cell of the network via the PUCCH.

In a second aspect, the exemplary embodiments relate to the resources that are to be utilized for HARQ signaling over the sidelink. As will be described in more detail below, some exemplary embodiments may relate to determining candidate PSFCH resources that may be utilized to provide feedback to the transmitting device. Other exemplary embodiments may relate to selecting resources that may be utilized by the transmitting device to perform a retransmission over the sidelink. The exemplary techniques described herein may be used with currently implemented sidelink HARQ procedures, future implementations of sidelink HARQ procedures or independently from other sidelink HARQ procedures.

FIG. 1 shows an exemplary network arrangement 100 according to various exemplary embodiments. The exemplary network arrangement 100 includes UEs 110, 112. Those skilled in the art will understand that the UEs 110, 112 may be any type of electronic component that is configured to communicate via a network, e.g., a component of a connected car, a mobile phone, a tablet computer, a smartphone, a phablet, an embedded device, a wearable, an Internet of Things (IoT) device, etc.

Throughout this description, the terms UE 110, UE and transmitting device may be used interchangeably. Additionally, the terms UE 112, further UE and receiving device may be also used interchangeably. It should also be understood that an actual network arrangement may include any number of UEs being used by any number of users. Thus, the example of two UEs 110, 112 is merely provided for illustrative purposes.

The UEs 110, 112 may communicate directly with one or more networks. In the example of the network configuration 100, the networks with which the UEs 110, 112 may wirelessly communicate are a 5G NR radio access network (5G NR-RAN) 120, an LTE radio access network (LTE-RAN) 122 and a wireless local access network (WLAN) 124. These types of networks support vehicle-to-everything (V2X) and/or sidelink communication. However, the UE 110 may also communicate with other types of networks and the UE 110 may also communicate with networks over a wired connection. Therefore, the UEs 110, 112 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UEs 110, 112 may connect to the 5G NR-RAN via the gNB 120A. The gNB 120A may be configured with the necessary hardware (e.g., antenna array), software and/or firmware to perform massive multiple in multiple out (MIMO) functionality. Massive MIMO may refer to a base station that is configured to generate a plurality of beams for a plurality of UEs. Reference to a single gNB 120A is merely for illustrative purposes. The exemplary embodiments may apply to any appropriate number of gNBs. The UEs 110, 112 may also connect to the LTE-RAN 122 via the eNB 122A.

Those skilled in the art will understand that any association procedure may be performed for the UEs 110, 112 to connect to the 5G NR-RAN 120 and the LTE-RAN 122. For example, as discussed above, the 5G NR-RAN 120 and the LTE-RAN 122 may be associated with a particular cellular provider where the UEs 110, 112 and/or the user thereof has a contract and credential information (e.g., stored on a SIM card). Upon detecting the presence of the 5G NR-RAN 120, the UEs 110, 112 may transmit the corresponding credential information to associate with the 5G NR-RAN 120. More specifically, the UEs 110, 112 may associate with a specific base station (e.g., the gNB 120A of the 5G NR-RAN 120, the eNB 122A of the LTE-RAN 122).

The UEs 110, 112 may also communicate with one another directly using a sidelink. The sidelink is a direct D2D communication link. Thus, the information and/or data transmitted directly to the other endpoint (e.g., the UE 110 or the UE 112) does not go through a cell (e.g., gNB 120A, eNB 122A). In some embodiments the UEs 110, 112 may receive information from a cell regarding how the sidelink is to be established, maintained and/or utilized. Thus, a network (e.g., the 5G NR-RAN 120, LTE-RAN 122) may control the sidelink. In other embodiments, the UEs 110, 112 may control the sidelink. Regardless of how the sidelink is controlled, the UEs 110, 112 may maintain a downlink/ uplink to a currently camped cell (e.g., gNB 120A, eNB 122A) and a sidelink to the other UE simultaneously.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
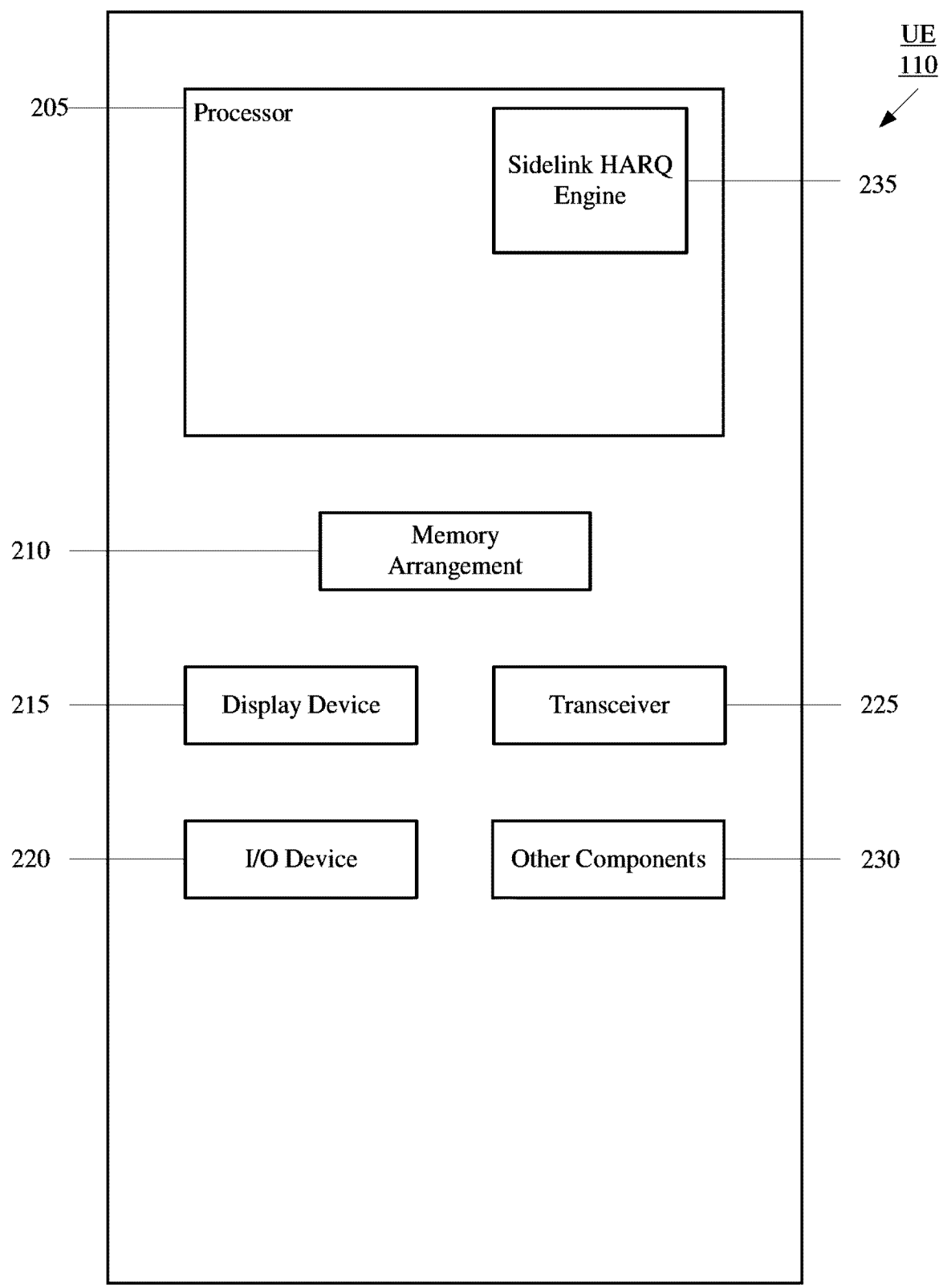
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225, an antenna panel 230 and other components 235. The other components 235 may include, for example, a SIM card, an embedded SIM (eSIM), an audio input device, an audio output device, a power supply, a data acquisition device, ports to electrically connect the UE 110 to other electronic devices, etc. The UE 110 illustrated in FIG. 2 may also represent the UE 112.

The processor 205 may be configured to execute a plurality of engines of the UE 110. For example, the engines may include a sidelink HARQ engine 235. The sidelink HARQ engine 235 may perform various operations related to utilizing HARQ for a sidelink. These operations may include, but are not limited to, providing an indication of sidelink HARQ feedback to the network, selecting resources to utilize for delivering HARQ feedback to the transmitting device, selecting resources to utilize for a retransmission, etc.

The above referenced engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the WLAN 122, etc. Accordingly, the transceiver 225 may operate on a variety of different frequencies or channels (e.g., set of consecutive frequencies).

For downlink communications, the UE 110 may be configured to provide a HARQ-ACK codebook to the corresponding cell of the network. The cell may provide the UE 110 with HARQ-ACK feedback timing information in downlink control information (DCI). Using the HARQ-ACK feedback timing information, the UE 110 may multiplex downlink HARQ-ACKS on assigned PUCCH resources. As mentioned above, the exemplary embodiments relate to constructing a sidelink HARQ-ACK codebook that is to be provided to a cell of the network via the PUCCH. To construct a sidelink HARQ-ACK codebook, various modifications may be made to procedures that may be used for constructing a downlink HARQ-ACK codebook. Accordingly, the exemplary embodiments may reference terms that are conventionally associated with downlink HARQ-ACK codebook construction when describing sidelink HARQ-ACK codebook construction.

Figure 3:
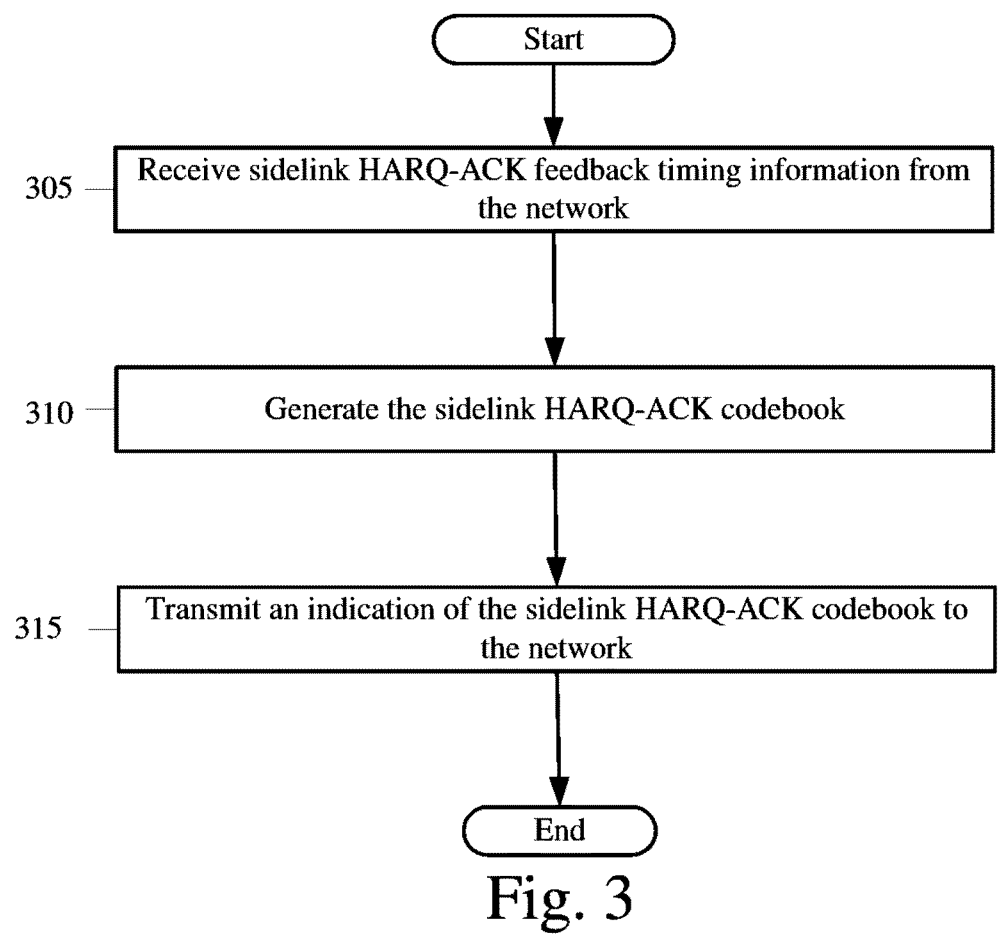
FIG. 3 shows a method for sidelink HARQ-ACK codebook construction according to various exemplary embodiments.

FIG. 3 shows a method 300 for sidelink HARQ-ACK codebook construction according to various exemplary embodiments. The method 300 will be described with regard to the UE 110 of FIG. 2 and the network arrangement 100 of FIG. 1.

In the method 300, within the context of sidelink HARQ signaling, the UE 110 may represent a transmitting device.

For example, the UE 110 and the UE 112 may establish a sidelink. The UE 110 may transmit data to the UE 112 via the PSSCH. In response, the UE 112 may provide HARQ feedback to the UE 110 via the PSFCH. The UE 110 may also have a connection to a cell of the corresponding network. For example, the UE 110 may be camped on the gNB 120A of the 5G NR-RAN 120. The method 300 will be described with regard to the UE 110 generating a sidelink HARQ-ACK codebook that represents the HARQ feedback received from the UE 112. The sidelink HARQ-ACK codebook may then be provided by the UE 110 to the currently camped cell via the PUCCH.

In 305, the UE 110 may receive sidelink HARQ-ACK feedback timing information from the network. The sidelink HARQ-ACK feedback timing information may provide the basis for generating the sidelink HARQ-ACK codebook at the UE 110.

The HARQ-ACK feedback timing information may be received from the network in DCI. For example, DCI format 3_0 may be configured to include a PSFCH-to-HARQ feedback timing indicator. However, reference to DCI format 3_0 is merely provided for illustrative purposes. The exemplary embodiments may apply to the HARQ-ACK feedback timing information being included in any appropriate type of DCI or signaling exchange performed with the network.

Similar to the K1 parameter used for downlink HARQ-ACK codebook construction, which represents the slot offset between physical downlink shared channel (PDSCH) reception and the PUCCH transmission, the PSFCH-to-HARQ feedback timing indicator represents the slot duration between the last PSFCH occasion and the PUCCH transmission. An example, of the PSFCH-to-HARQ feedback timing indicator is illustrated in the exemplary scenario 450 of FIG. 4b.

There may be scenarios in which the network does not provide PUCCH resources for the sidelink HARQ-ACK codebook. Without PUCCH resources, the UE 110 may not be able to report the sidelink HARQ-ACK feedback to the network. In these types of scenarios, the network may indicate to the UE 110 that there are no PUCCH resources assigned for the sidelink HARQ-ACK feedback. In some embodiments, this indication may be provided in an information element (IE). To provide an example, a PUCCH-config-SL IE may be included in DCI format 3_0 that indicates to the UE 110 whether a PUCCH resource is configured to sidelink HARQ feedback. In other embodiments, this indication may be provided in a field of the DCI. To provide an example, a field in DCI format 3_0 may be configured to include information relevant to providing sidelink HARQ feedback in the uplink. A particular type of element may be designated to indicate that there are no PUCCH resources assigned for the sidelink HARQ-ACK feedback. In this example, the field in DCI format 3_0 may be configured to include up to eight elements. If one of the elements is set to a value of infinite, this may indicate to the UE 110 that there are no PUCCH resources assigned for the sidelink HARQ-ACK feedback. However, the above examples are merely provided for illustrative purposes. The exemplary embodiments may apply to the network utilizing any appropriate mechanism to indicate to the UE 110 that there are no PUCCH resources assigned for the sidelink HARQ-ACK feedback.

In 310, the UE 110 generates the sidelink HARQ-ACK codebook. As mentioned above, multiple PSFCH-to-HARQ feedback timing indicators each corresponding to a different PSFCH occasion may be used to generate the sidelink HARQ-ACK codebook. The sidelink HARQ-ACK codebook may be constructed in decreasing order of the multiple PSFCH-to-HARQ feedback timing indicators.

It should be understood that unlike downlink HARQ-ACK codebook construction which relies on downlink subcarrier spacing, sidelink HARQ-ACK codebook construction uses sidelink subcarrier spacing. Further, to determine the slot configuration for the sidelink, the UE 110 may utilize the sidelink parameters similar to the cell-specific higher layer parameters of "TDD-UL-DL-Configuration-Common" and "TDD-UL-DL-ConfigurationDedicated."

When constructing the downlink HARQ-ACK codebook, for each K1 value, the configured PDSCH time domain resource allocation list provides a table for candidate PDSCH receptions. PDSCH resources are not relevant to sidelink HARQ signaling. Thus, when constructing the sidelink HARQ-ACK codebook the PDSCH time resource is replaced by PSSCH time resources associated with the last PSFCH occasion.

The slot offset between the PSSCH and its corresponding PFSCH is configured per resource pool. The slot offset may also depend on the resource pool logical slot and PSFCH periodicity configurations. The time mapping from a PSFCH occasion to its associated PSSCH may be a one-to-many mapping. Further, the preconfigured PSSCH time resource associated with the last PSFCH occasion provides a table for candidate PSSCH transmissions. Thus, each possible PSSCH transmission slot, which result in a PSFCH occasion at a given offset from PUCCH, serve as candidate occasions for further processing.

The sidelink HARQ-ACK codebook may be constructed in decreasing order of the PSSCH transmission slot associated with a configured PSFCH occasion. For downlink communications, the K0 parameter which represents the time duration between downlink grant (e.g., DCI) and the corresponding PDSCH reception may be used for HARQ-ACK codebook construction. For sidelink HARQ-ACK codebook construction, K0 may be represented by time duration (e.g., slots) between the PSSCH and the corresponding PSFCH.

Figures 4A, 4B:
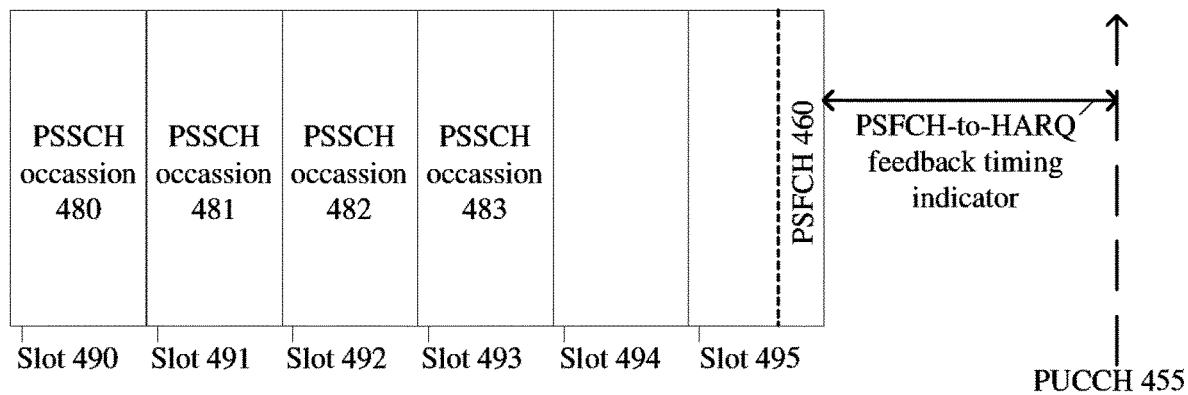
FIG. 4a shows an exemplary table of candidate PSSCH transmission occasions.
FIG. 4b shows an exemplary scenario that illustrates candidate PSSCH transmission occasions associated with a PSFCH.

FIG. 4a shows an exemplary table 400 of candidate PSSCH transmission occasions. The exemplary table 400 includes a column 405 which shows the row index value. The row index value may be indicated in a time domain resource assignment field of a DCI and correspond to PSSCH time domain resource allocation. The exemplary table 400 also include a column 410 which shows the time duration between the PSSCH and PSFCH (e.g., K0) for each row number. The time duration between the PSSCH and PSFCH may be represented in slots.

FIG. 4b shows an exemplary scenario 450 that illustrates candidate PSSCH transmission occasions associated with a PSFCH. The exemplary scenario 450 illustrate that a PUCCH transmission 455 is scheduled for a first time and a PSFCH transmission 460 is scheduled for a second time. The time duration between the PSFCH 460 and the PUCCH 455 may be indicated by PSFCH-to-HARQ feedback timing indicator included in the DCI received in 305. This time duration is similar to the K1 value used in downlink HARQ-ACK codebook construction.

In the exemplary scenario 450, the PSFCH 460 is shown as being included in slot 495 which is one of six slots 490-495 shown in this example. Further, in this example, slot 490 is shown as including PSSCH occasion 480, slot 491 is shown as including PSSCH occasion 481, slot 492 is shown as including PSSCH occasion 482 and slot 493 is shown as including PSSCH occasion 483. Sidelink HARQ feedback corresponding to each PSSCH occasion 480-483 is to be included in the associated PSFCH transmission 460 that is to be received by the UE 110 in response to transmitting on the PSSCH occasions 480-483. The HARQ feedback corresponding to each PSSCH occasion 480-483 is also to be included in the PUCCH transmission 455 that is to be provided by the UE 110 to a cell of the corresponding network.

As mentioned above, the sidelink K0 value may represent the time duration between a PSSCH occasion and the PSFCH. In the exemplary scenario 450, the sidelink K0 value for PSSCH occasion 480 is equal to five slots, the sidelink K0 value for PSSCH occasion 481 is equal to four slots, the sidelink K0 value for PSSCH occasion 482 is equal to three slots and the sidelink K0 value for PSSCH occasion 483 is equal to two slots.

Returning to the method 300, from the perspective of the UE 110, the sidelink HARQ-ACK codebook may be a collection of data that represents multiple instances of HARQ feedback relative to the sidelink with the UE 112. The multiple instances of HARQ feedback may be configured as a matrix or a bitmap.

If simultaneous PSSCH transmissions in a single slot are configured, the UE 110 may generate the sidelink HARQ-ACK codebook using a frequency first, time second rule. For example, the UE 110 may be configured with multiple sidelinks and thus, multiple PSSCH occasions may occur on the same slot. Each PSSCH may be configured to be transmitted on a different frequency. Thus, each instance of sidelink HARQ feedback may be associated with a slot (e.g., time) and a frequency. There may be multiple PSSCH occasions in each slot but not on each frequency. Thus, all the candidate PSSCH occasions in the same slot with different frequency locations are packed in the sidelink HARQ-ACK codebook first.

In 315, a representation of the sidelink HARQ-ACK codebook is transmitted to the network. For example, the UE 110 may transmit the matrix including an indication of multiple instances of HARQ feedback relative to the sidelink with the UE 112 to the currently camped cell on a PUCCH resource. Subsequently, the method 300 ends.

The method 300 was described with regard to constructing a type 1 HARQ-ACK codebook (e.g., semi-static) to report sidelink HARQ feedback to the network. However, those skilled in the art will understand that similar techniques may be used to construct a type 2 HARQ-ACK codebook (e.g., dynamic) to report sidelink HARQ feedback to the network.

Another aspect of the exemplary embodiments relates to determining candidate PSFCH resources that may be utilized to provide feedback to the transmitting device. In other words, how does the receiving device determine the network resources to utilize for PSFCH transmissions.

Figure 5:
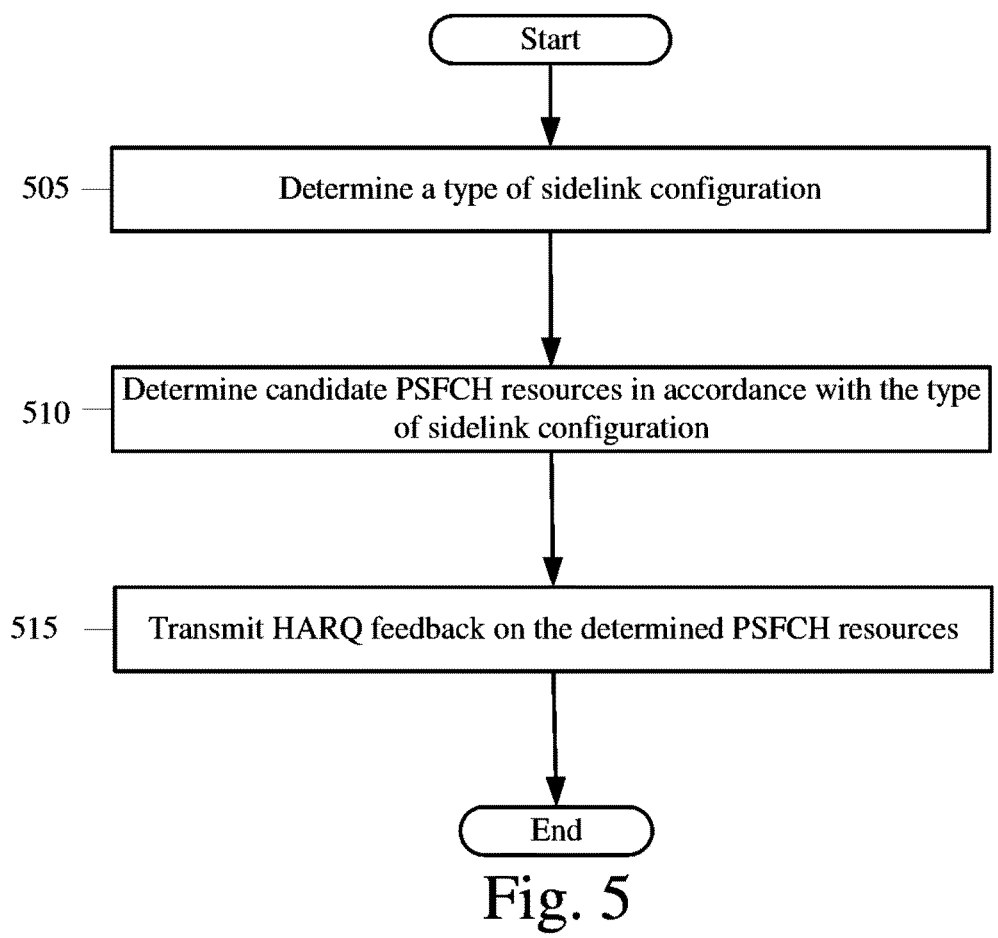
FIG. 5 shows a method for candidate PSFCH resource determination according to various exemplary embodiments.

FIG. 5 shows a method 500 for candidate PSFCH resource determination according to various exemplary embodiments. The method 500 will be described with regard to the UE 110 of FIG. 2 and the network arrangement 100 of FIG. 1.

In the method 500, within the context of sidelink HARQ signaling, the UE 110 may represent a receiving device. For example, the UE 110 and the UE 112 may establish a sidelink. The UE 112 may transmit data to the UE 110 via the PSSCH. In response, the UE 110 may provide HARQ feedback to the UE 112 via the PSFCH.

In 505, the UE 110 determines a type of sidelink configuration. Types of sidelink configurations may include, but are not limited to, unicast option 1, unicast option 2, groupcast option 1, groupcast option 2 and a resource pool. In some embodiments, the determination of the type of sidelink configuration may be based on information received from a cell of the network in DCI and/or radio resource control (RRC) signaling. In other embodiments, the determination of the type of sidelink configuration may be based on information receiving from a further UE (e.g., UE 112) during synchronization procedures, discovery procedures or any other procedure in which control information is exchanged between UEs. The above examples are merely provided for illustrative purposes, those skilled in the art will understand the type of information that may be used by the UE 110 to determine the type of sidelink configuration.

Groupcast option 1 may be characterized as a NACK only scheme. For example, the receiving device is configured to transmit a HARQ NACK on the PSFCH if the receiving device fails to decode at least a portion of the transport block received on the PSSCH. Otherwise, the receiving device does not provide any HARQ feedback on the PSFCH.

Unicast and groupcast option 2 may be characterized as an ACK/NACK scheme. For example, the receiving device is configured to transmit a HARQ ACK on the PSFCH if the receiving device is able to decode the transport block received on the PSSCH. The receiving device is configured to transmit a HARQ NACK on the PSFCH if the receiving device fails to decode at least a portion of the transport block received on the PSSCH.

The resource pool may refer to a set of time and frequency resources that can be used for sidelink transmission and reception. The receiving device may be (pre)configured with one or more resource pools.

In 510, the UE 110 determines candidate PSFCH resources in accordance with the type of sidelink configuration. The candidate PSFCH is a set of physical resource blocks (PRBs) that may be used to provide the HARQ feedback to the transmitting device (e.g., the UE 112). For unicast and groupcast option 1, the candidate PSFCH resources are determined based on the starting subchannel and slot used for the PSSCH. For groupcast option 2, the candidate PSFCH resources are determined based on the subchannels and slots used for PSSCH. For resource pool configuration, an indication may be provided to the UE 110 as to whether the candidate PSFCH resources are determined based on i) the starting subchannel and slot used for PSSCH or ii) the subchannels and slot for PSSCH.

In 515, the UE 110 transmits HARQ feedback on the determined PSFCH resources to the transmitting device (e.g., UE 112). For example, the HARQ feedback may be transmitted using the PRBs determined in 510. Within the set of PRBs configured for the PSFCH, the first set of PRBs are associated with the first subchannel in the first slot associated with the PSFCH slot, the second set of PRBs are associated with first subchannel in the second slot associated with the PSFCH slot and so on. Subsequently, the method 500 ends.

Another aspect of the exemplary embodiments relates to selecting network resources that may be utilized to for a retransmission. In other words, how does the transmitting device select resources to utilize for a retransmission to the receiving device.

Figure 6:
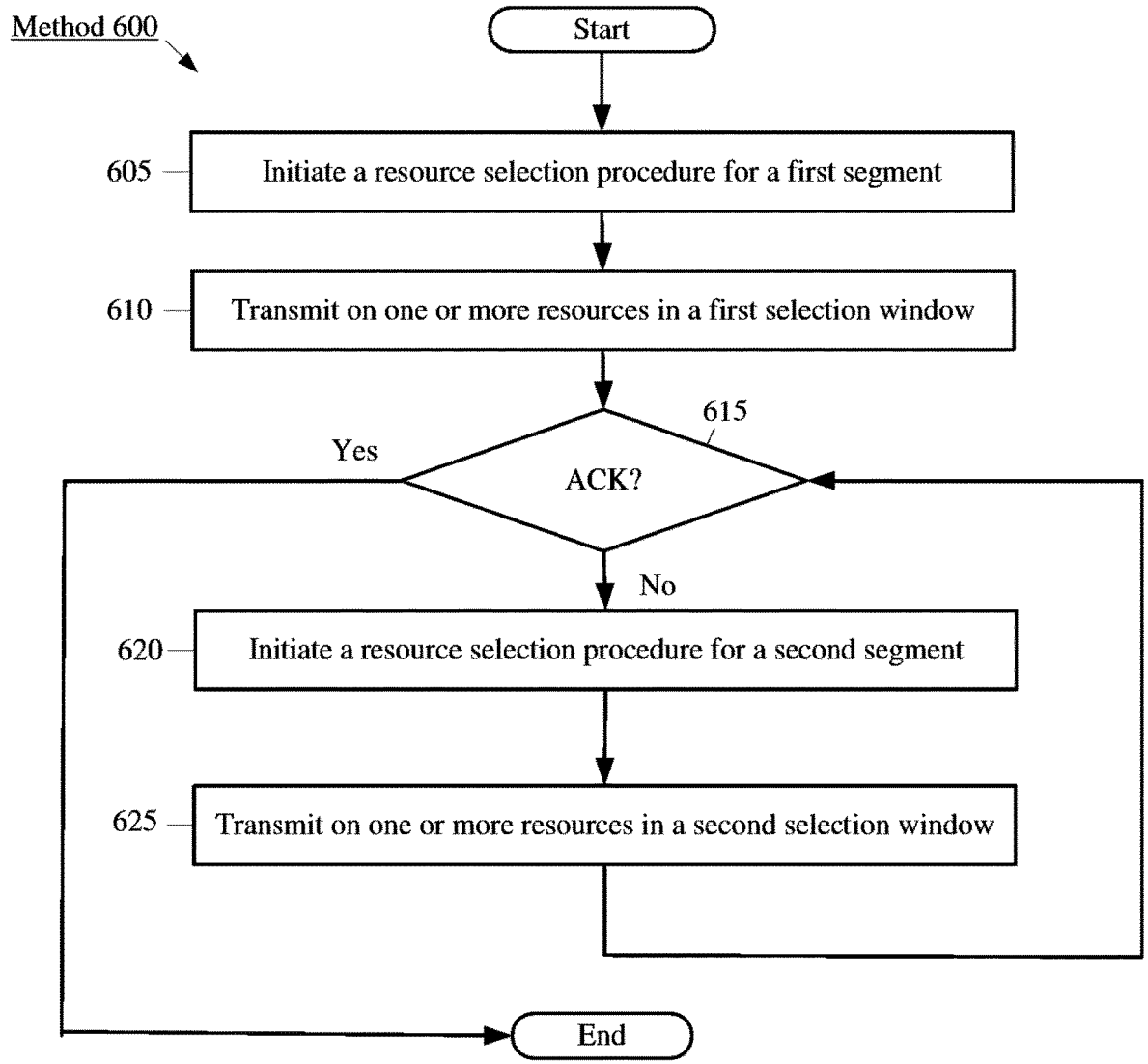
FIG. 6 shows a method for candidate segmented resource reselection for retransmissions according to various exemplary embodiments.

FIG. 6 shows a method 600 for candidate segmented resource reselection for retransmissions according to various exemplary embodiments. The method 600 will be described with regard to the UE 110 of FIG. 2 and the network arrangement 100 of FIG. 1.

In the method 600, within the context of sidelink HARQ signaling, the UE 110 may represent a transmitting device.

For example, the UE 110 and the UE 112 may establish a sidelink. The UE 110 may transmit data to the UE 112 via the PSSCH. In response, the UE 112 may provide HARQ feedback to the UE 110 via the PSFCH. If the UE 110 receives a NACK (or ambiguous feedback), the UE 110 may be triggered to perform a retransmission on the PSSCH.

Figure 7:
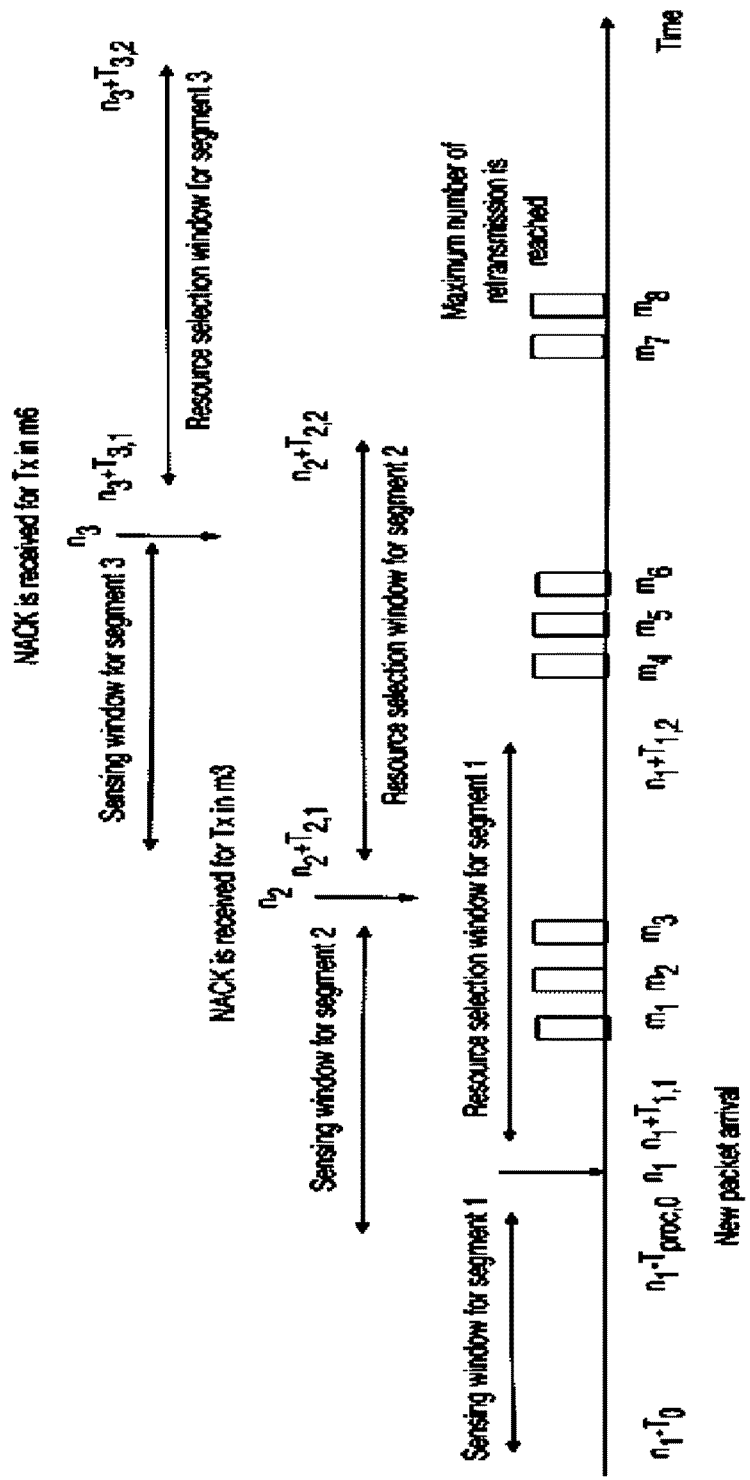
FIG. 7 illustrates an exemplary timeline and procedure for segmented resource reselection according to various exemplary embodiments.

FIG. 7 illustrates an exemplary timeline and procedure for segmented resource reselection. FIG. 7 is intended to supplement the description of the method 600.

In 605, a resource selection procedure is initiated for a first segment. Resource selection may utilize a sensing window with a predetermined duration. During the sensing window, the UE 110 may generate a set of resource candidates in the corresponding resource selection window. Where $N_{max}$ represents the number of resources that are to be selected in the resource selection window. $N_{max}$ represents the maximum number of resources for a transport block that may be reserved in sidelink control information (SCI). The first segment may represent both the first sensing window and the first selection window. As will be described below, additional segments may be utilized if an ACK is not received in response to the one or more transmissions performed in the first segment.

The resources selection window may be represented by $[n_1+T_{1,1}, n_1+T_{1,2}]$, where $n_1$ represents the time of when a new transport block is ready for delivery. The lower bound of $T_{1,2}$ may be based on factors including, but not limited to, data priority, remaining packet delay budget, (pre)configured number of retransmissions N and $N_{max}$. Generally, a larger N and smaller $N_{max}$ causes a smaller $T_{1,2}$. Similarly, a smaller N and larger $N_{max}$ causes a smaller $T_{1,2}$. In the example depicted in FIG. 7, (pre)configured number of retransmissions N is equal to eight.

In 610, the UE 110 transmits on one or more of the selected resources in the first selection window. For example, if three resources are reserved in the selection window, the UE 110 may initially transmit on the first selected resource in the first segment. The UE 110 may then transmit on the second selected resource in the first segment if possible and an ACK for the transmission on the first selected resource has not been received. If an ACK has been received, there is no need to retransmit on the second selected resource because the receiving device has already successfully received the data payload. The UE 110 may then transmit on the third selected resource if possible and an ACK for the transmission on the second selected resource has not been received. In the example depicted in FIG. 7, $N_{max}$ is set to three. Thus, three resources $m_1$, $m_2$, $m_3$ are shown as being reserved in the selection window for the first segment.

In 615, the UE 110 determines whether an ACK has been received in response to the one or more transmissions performed in the first selection window. As indicated above, if an ACK has been received this indicates that the receiving device (e.g., UE 112) has successfully received the data payload. Accordingly, if an ACK has been received the method 600 ends. If an ACK has not been received, the method 600 continues to 620. In the example depicted in FIG. 7, no ACKs are received for any of the transmissions performed in the resource selection window for the first segment. Instead, a NACK is depicted as being received in response to one or more transmissions performed in the selection window for the first segment.

In 620, a resource selection procedure is initiated for a second segment. Thus, a sensing window for the second segment and a selection window for the second segment are configured. The UE 110 may be configured to perform j-th selection procedures. Where j may represent any appropriate number of segments (e.g., 2, 3, 5, 10, 20, etc.). In the example depicted in FIG. 7, three segments are illustrated.

In some embodiments, the resources for first segment may have already been reserved in the SCI of the previous transport block. Thus, in these types of scenarios, the resource selection procedure does not need to be performed. However, if no ACK was received in response to a transmission performed on the reserved resources, 615-625 of the method 600 may still be utilized for retransmissions.

The UE 110 may be configured with a transmission budget. The number of resources selected in the second segment may consider the transmission budget. For example, $\min\{N_{max}, N_{rem}\}$ resources are to be selected. $N_{rem}$ represents the remaining transmission budget and is the difference between (pre)configured number of retransmissions N and the total number of retransmissions that occurred for the existing transport block (e.g., the data that is subject to the retransmitted). The selected $\min\{N_{max}, N_{rem}\}$ are within the resource selection window for second segment. The SCI for transmission that occur in segments other than the first segment do not contain a resource reservation period. Further, there is no time gap limitation between segment j−1 and the current segment. Thus, in the example depicted in FIG. 7 the first segment overlaps with the second segment and the second segment overlaps with the third segment.

In 625, the UE 110 transmits on one or more of the selected resources in the second selection window. For example, if three resources are reserved in the second selection window, the UE 110 may initially transmit on the first selected resource in the second segment. The UE 110 may then transmit on the second selected resource in the second segment if possible and an ACK for the transmission on the first selected resource has not been received. If an ACK has been received, there is no need to retransmit on the second selected resource because the receiving device has already successfully received the data payload. The UE 110 may then transmit on the third selected resource if possible and an ACK for the transmission on the second selected resource has not been received. In example depicted in FIG. 7, three resources $m_4$, $m_5$, $m_6$ are shown as being reserved in the selection window for the first segment. As indicated above, the number of selected resources may be based on $\min\{N_{max}, N_{rem}\}$.

Subsequently, the method 600 returns to 615 where the UE 110 determines whether an ACK has been received. This process may repeat itself until an ACK is received or the maximum number of retransmissions is performed. In the example depicted in FIG. 7, no ACK is received in response to any transmission performed in the second selection window. Thus, a selection procedure is initiated for a third segment. However, as indicated above, the (pre)configured number of retransmissions N is equal to eight. Since 6 resources have already been utilized for retransmissions, e.g., $m_1$, $m_2$, $m_3$, $m_4$, $m_5$, $m_6$, only two resources are selected in the third selection window. Those skilled in the art would understand that similar schemes may be applied to both HARQ feedback based retransmissions and blind retransmissions.

Other aspects of the exemplary embodiments relate to selecting a UE that is to service as a synchronization source. In 5G NR, signaling via the physical sidelink broadcast channel (PSBCH) may include various components including but not limited to. DFN, an indication of TDD configuration, a slot index, an in-coverage indicator, a cyclic redundancy check (CRC), payload, etc. In this example, the PSBCH includes a 10-bit DFN, a 12-bit indication of TDD configuration, a 7-bit slot index, a 1-bit in-coverage indicator, reserved bits and a 24-bit CRC with total payload size of 56 bits.

The synchronization source priority may have two configurations, Global Navigation Satellite System (GNSS)-based synchronization or gNB/eNB-based synchronization. In GNSS-based synchronization, the priority of the synchronization source may be ordered as follows: GNSS has the highest priority, UE directly synchronized to GNSS has the second highest priority, UE indirectly synchronized to GNSS has the third highest priority, gNB/eNB has the fourth highest priority, UE directly synchronized to gNB/eNB has the fifth highest priority, UE indirectly synchronized to gNB/eNB has the sixth highest priority and the remaining UEs have the lowest priority.

In the gNB/eNB-based synchronization, the priority of the synchronization source may be ordered as follows: gNB/eNB has the highest priority, UE directly synchronized to gNB/eNB has the second highest priority, UE indirectly synchronized to gNB/eNB has the third highest priority, GNSS has the fourth highest priority, UE directly synchronized to GNSS has the fifth highest priority, UE indirectly synchronized to GNSS has the sixth highest priority and the remaining UEs have the lowest priority.

Accordingly, in either GNSS-based synchronization or gNB/eNB-based synchronization, a further UE may be selected as the synchronization source. In LTE vehicle to everything (V2X), the UE associated with the highest sidelink reference signal receive power (RSRP) may be selected as synchronization source. In NR V2X, the UE with lowest sidelink synchronization signal (SLSS) ID may be selected as the synchronization source if it is associated with a sidelink RSRP that is above a threshold value. This may be done to merge multiple independent clusters.

If two independent clusters have the same SLSS ID, then one (or a combination) of the following schemes may be implemented. In a first scheme, the UE with the strongest sidelink RSRP may be selected as the synchronization source. In a second scheme, the UE associated with an in-coverage indicator of the PSBCH ON may be selected as the synchronization source. In a third scheme, the UE with the smallest number of hops may selected as the synchronization source (if the number of hops in included in PSBCH). The UE with the smallest number of hops may be selected because the smallest number of hops indicates that the UE is closer to an independent UE-type synchronization source with smaller timing offset In a fourth scheme, the UE with the largest number of hops may be selected (if the number of hops in included in PSBCH) as the synchronization source. The UE with the largest number of hops may be selected because the largest number of hops indicates the larger cluster which is going to dominate the coverage area.

Examples

A first example includes a user equipment (UE) comprising a transceiver configured to communicate with a further UE via a sidelink and to communicate with a cell of a network via an uplink and a processor communicatively coupled to the transceiver and configured to perform operations. The operations comprise receiving an indication that no physical uplink control channel resources (PUCCH) are assigned by the network for providing sidelink hybrid automatic repeat request (HARQ) feedback to the network and transmitting a HARQ feedback to the further UE.

A second example includes the UE of the first example, wherein the indication is received via downlink control information (DCI).

A third example includes the UE of the second example, wherein the DCI is a format 3_0 DCI.

A fourth example includes a user equipment (UE) comprising a transceiver configured to communicate with a further UE via a sidelink and a processor communicatively coupled to the transceiver and configured to perform operations. The operations comprise initiating a first resource selection procedure, wherein the first resource selection procedure includes a first sensing window and a first resource selection window, transmitting data on one or more resources in the first resource selection window, determining whether an acknowledgement (ACK) has been received in response to transmitting on the one or more resources in the first resource selection window, when no ACK has been received, initiating a second resource selection procedure, wherein the second resource selection procedure includes a second sensing window and a second resource selection window and transmitting the data on one or more resources in the second resource selection window.

A fifth example includes the UE of the fourth example, wherein the operations further comprise generating a set of resource candidates in the corresponding resource selection window, wherein $N_{max}$ represents a maximum number of resource candidates for a transport block that are reserved in sidelink control information (SCI).

A sixth example includes the UE of the fourth example, wherein a size of the first resource selection window is based on one of a time when a new transport block is ready for delivery, a data priority, a remaining packet delay budget, or a configured number of retransmissions.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to communicate with a further UE via a sidelink, the processor configured to:
   determine candidate physical sidelink feedback channel (PSFCH) resources corresponding to a resource pool, wherein the candidate PSFCH resources are based on an allocated subchannel used for a physical sidelink shared channel (PSSCH); and
   transmit hybrid automatic repeat request (HARQ) feedback on one or more of the PSFCH resources.

2. The processor of claim 1, wherein the HARQ feedback is multiplexed on the PSFCH resources.

3. The processor of claim 1, wherein the HARQ feedback is multiplexed on the PSFCH resources.

4. The processor of claim 1, wherein the candidate PSFCH resources further correspond to unicast.

5. The processor of claim 1, wherein the candidate PSFCH resources further correspond to groupcast option 1.

6. The processor of claim 1, wherein the candidate PSFCH resources further correspond to groupcast option 2 and wherein determining the candidate PSFCH resources is further based on a slot used for PSSCH reception.

7. A method performed by a user equipment (UE) configured to communicate with a further UE via a sidelink, the method comprising:
   determining candidate physical sidelink feedback channel (PSFCH) resources corresponding to a resource pool, wherein the candidate PSFCH resources are based on an allocated subchannel used for a physical sidelink shared channel (PSSCH); and
   transmitting hybrid automatic repeat request (HARQ) feedback on one or more of the PSFCH resources.

8. The method of claim 7, wherein the HARQ feedback is multiplexed on the PSFCH resources.

9. The method of claim 7, wherein the HARQ feedback is multiplexed on the PSFCH resources.

10. The method of claim 7, wherein the candidate PSFCH resources further correspond to unicast.

11. The method of claim 7, wherein the candidate PSFCH resources further correspond to groupcast option 1.

12. The method of claim 7, wherein the candidate PSFCH resources further correspond to groupcast option 2 and wherein determining the candidate PSFCH resources is further based on a slot used for PSSCH reception.

13. A user equipment (UE), comprising:
   a transceiver configured to communicate with a further UE via a sidelink; and
   a processor communicatively coupled to the transceiver and configured to perform operations comprising:
   determining candidate physical sidelink feedback channel (PSFCH) resources corresponding to a resource pool, wherein the candidate PSFCH resources are based on an allocated subchannel used for a physical sidelink shared channel (PSSCH); and
   transmitting hybrid automatic repeat request (HARQ) feedback on one or more of the PSFCH resources.

14. The UE of claim 13, wherein the HARQ feedback is multiplexed on the PSFCH resources.

15. The UE of claim 13, wherein the candidate PSFCH resources further correspond to unicast.

16. The UE of claim 13, wherein the candidate PSFCH resources further correspond to groupcast option 1.

17. The UE of claim 13, wherein the candidate PSFCH resources further correspond to groupcast option 2 and wherein determining the candidate PSFCH resources is further based on a slot used for PSSCH reception.

* * * * *